April 25, 1967   F. FRITSCH   3,315,546
EPICYCLIC GEAR
Filed Sept. 28, 1964

INVENTOR.
Felix Fritsch
BY Wood, Herron & Evans
ATTORNEYS

United States Patent Office 3,315,546
Patented Apr. 25, 1967

3,315,546
EPICYCLIC GEAR
Felix Fritsch, Vienna, Austria, assignor to Simmering-Graz-Pauker Aktiengesellschaft für Maschinen-, Kessel- und Waggonbau, Vienna, Austria
Filed Sept. 28, 1964, Ser. No. 399,625
Claims priority, application Austria, Sept. 26, 1963, A 7,737/63
1 Claim. (Cl. 74—801)

This invention relates to an epicyclic gear, comprising a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever, and means for operatively coupling the free ends of the levers.

It is an object of the invention to facilitate the manufacture of such gears and to obtain a higher precision with the aid of simpler methods of manufacture.

It is a further object of the invention to simplify the structure of such gears.

Hence, it is a feature of the invention to provide an epicyclic gear which comprises a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever and means for operatively coupling the free ends of the levers, said means including radially extending links, each of said links being connected at one end to the free end of one of said levers and all said links being articulatedly interconnected at their other end in a single point.

Another feature of the invention resides in that said links lie in a plane which is normal to the axis of the gear.

Still another feature of the invention resides in that the axis of the articulate connection of the other ends of said links in their central position is aligned with the gear axis and each of said links is at right angles to the associated lever.

It is also a feature of the invention that one of said links is forked at its end remote from the lever and said fork receives the ends of the others of said links, said other links being offset.

Figure 1:
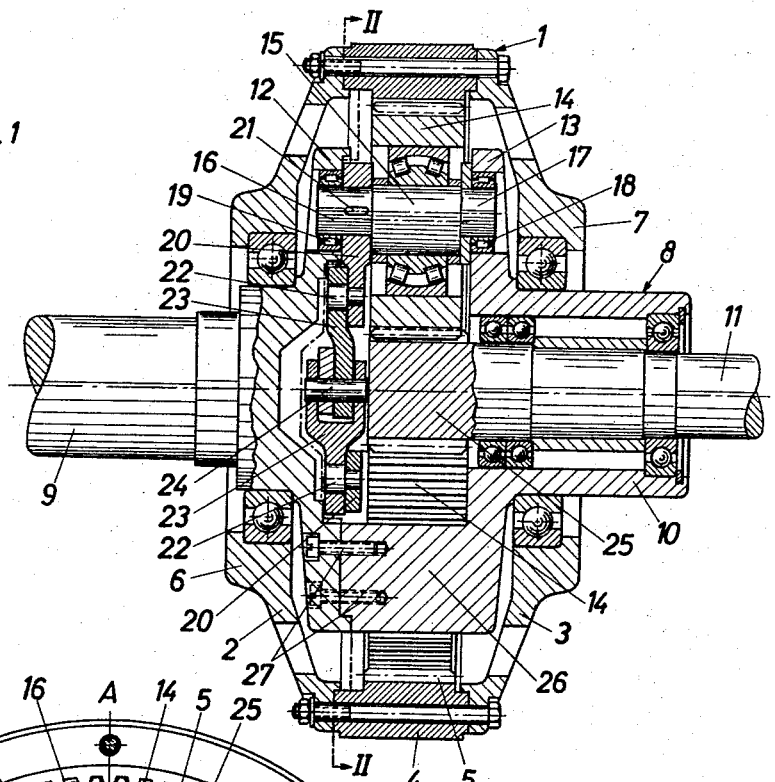
Figure 2:
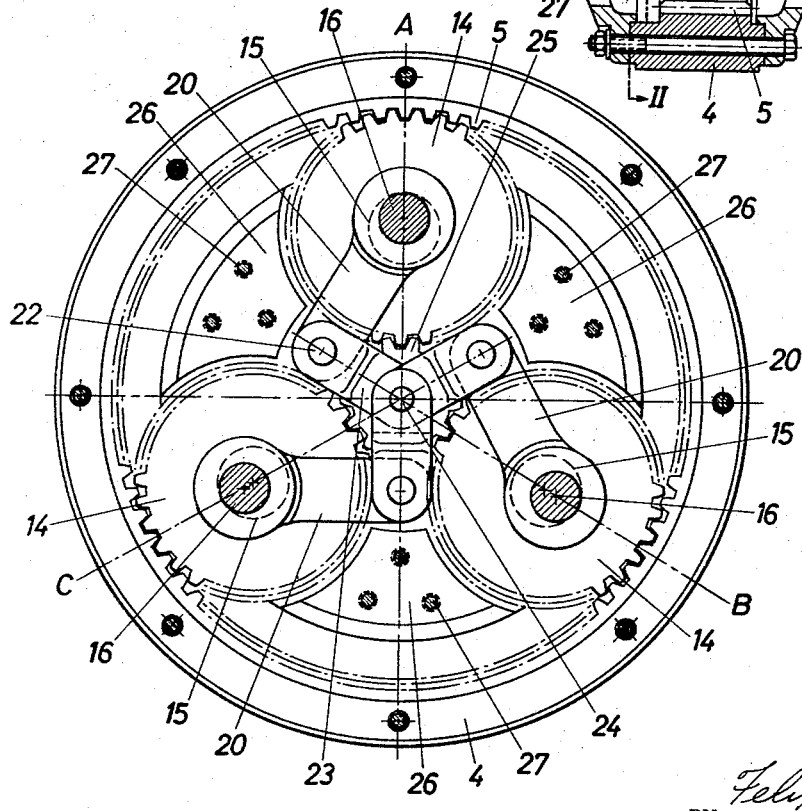

An illustrative embodiment of the invention is shown in the drawing. FIG. 1 is a longitudinal sectional view showing the epicyclic gear. FIG. 2 is a transverse sectional view taken on line II—II of FIG. 1.

The epicyclic gear is accommodated in a housing 1, which consists of the two covers 2, 3 and the cylindrical intermediate part 4 rigidly connected thereto. This intermediate part 4 serves as a hollow wheel and is provided with an internal gear ring 5. A planet carrier 8 mounted in the hubs 6 and 7 of the covers 2 and 3 is connected at its output end to the output shaft 9 mounted in the hub 6 and has at its input end a hollow hub 10 mounted in the hub 7 and serving to receive the input shaft 11.

The planet carrier 8 has two spaced, opposed cheeks 12, 13, which are connected by lugs 26 and screws 27 and between which three planet wheels 14 are disposed, which are mounted in bearings spaced 120° apart and which mesh with the gear ring 5 of the hollow wheel 4 and with the sun wheel 25, which is disposed at the center of the gear and connected to the drive shaft 11.

Each of the epicyclic wheels 14 is carried by an eccentric pin 15, the eccentric end portions 16 and 17 are mounted in needle bearings 18 and 19 carried by the cheeks 12 and 13. Each of the end portions 16 has pushed thereon an eye bearing formed by one end of a lever 20 and coupled to the end portion 16 for rotation, e.g., by means of a key 21. The other end of each lever 20 is connected by a pin 22 to one end of a link 23. The other ends of these levers are articulatedly interconnected by a pin 24. The links 23 lie substantially in a plane which is at right angles to the axis of the gear. In its central position, each link is at right angles to the lever 20 connected to it. Further in the central position of the links 23, the axis of the pin 24 interconnecting the levers is substantially aligned with the gear axis.

In the illustrated embodiment comprising three planet wheels and with three levers and three links, one of the three links is forked at its end remote from the lever 20 and this fork receives the ends of the two other links. These other links are offset. This design is clearly apparent from FIG. 1.

Adjacent links include an angle of 120° between them, as the three planet wheels are also evenly angularly spaced. When the links and levers are in their central position, the axis of each planet wheel 14, the axis of the pin 15 carrying the same, the axis of its eccentrically mounted end portions 16, 17 and the axis of the sun wheel 25 and of the gear as a whole lie in the same plane. These planes of said axes which belong to the planet wheels 14 are indicated with dash and dot lines in FIG. 2 and designated A, B and C.

As has been mentioned hereinbefore, the levers 20 are so arranged and secured to the eccentric pins that the links 23 are at right angles to the levers 20 when these parts are in their central position.

Hence, the links 23 are freely movable in a plane which is at right angles to the axis of the gear and are carried only by the levers 20. As they are balanced only by the three forces radially transmitted by the levers 20 in directions spaced 120° apart, these three forces must be approximately equal in magnitude. Since the lengths of the levers and the eccentricities of the pins 22 are also equal to each other, the loads on the shafts of the three planet wheels must also be equal in magnitude. This affords a solution to the problem how to achieve a uniform load distribution on all planet wheels.

The described gear operates as follows: the rotation coming from the input shaft 11 is transmitted to the planet wheels 14 by the sun wheel 25. The planet wheels 14 mesh with and revolve along the gear ring 5 of the stationary housing 1 and transmit their rotation by means of the eccentric pins 15 and their end portions 16, 17 to the planet carrier 8, which drives the output shaft 9. It is obvious that motion can also be transmitted in the other sense, from shaft 9 to shaft 11.

If manufacturing inaccuracies result in differences between the angles between the bearings for the eccentric pins or between the points where the pins are arranged in the free ends of the levers, this will necessarily result in differences in the distribution of the load to the three planet wheels. However, these differences are so small that they are practically insignificant.

Whereas three planet wheels are provided in the illustrative embodiment shown, the design according to the invention can also be applied to arrangements comprising four or more planet wheels.

I claim:
An epicyclic gear, comprising a sun wheel, a plurality of planet wheels grouped around and meshing with said sun wheel, a hollow wheel surrounding and meshing with the planet wheels, a planet wheel carrier, eccentric pins freely rotatably mounted in said planet wheel carrier, the planet wheels being freely rotatably mounted on said eccentric pins, each of said eccentric pins being connected to one end of a lever and means for operatively coupling the free ends of the levers, said means including radially extending links, each of said links being connected at one end to the free end of one of said levers and all said links being articulatedly interconnected at their other end in a single point, one of said links being forked at its end remote from the lever and said fork receiving the ends of the others of said links, said other links being offset.

References Cited by the Examiner

UNITED STATES PATENTS

| | | | |
|---|---|---|---|
| 1,007,645 | 10/1911 | Hertner et al. | 267—67 X |
| 3,080,775 | 3/1963 | Fritsch | 74—801 |

FOREIGN PATENTS

| | | |
|---|---|---|
| 701,492 | 3/1931 | France. |

DAVID J. WILLIAMOWSKY, *Primary Examiner.*

J. R. BENEFIEL, *Assistant Examiner.*